(12) United States Patent
Peak et al.

(10) Patent No.: US 9,349,146 B2
(45) Date of Patent: May 24, 2016

(54) SYSTEMS AND METHODS TO INTELLIGENTLY DETERMINE INSURANCE INFORMATION BASED ON IDENTIFIED BUSINESSES

(75) Inventors: David F. Peak, Avon, CT (US); Anil Vasagiri, Hamden, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 25 days.

(21) Appl. No.: 13/364,733

(22) Filed: Feb. 2, 2012

(65) Prior Publication Data

US 2013/0144656 A1 Jun. 6, 2013

Related U.S. Application Data

(60) Provisional application No. 61/565,668, filed on Dec. 1, 2011.

(51) Int. Cl.
*G06Q 40/00* (2012.01)
*G06Q 40/08* (2012.01)

(52) U.S. Cl.
CPC ..................................... *G06Q 40/08* (2013.01)

(58) Field of Classification Search
CPC ....... G06Q 40/00; G06Q 50/00; G06Q 10/00; G06Q 30/00; G06Q 20/00; G06F 19/00
USPC ....................................................... 705/3–44
See application file for complete search history.

(56) References Cited

U.S. PATENT DOCUMENTS

| | | | | |
|---|---|---|---|---|
| 6,119,093 A * | 9/2000 | Walker et al. | | 705/4 |
| 6,236,973 B1 * | 5/2001 | Dillard | | 705/36 R |
| 7,685,008 B2 * | 3/2010 | McGiffin et al. | | 705/4 |
| 7,945,497 B2 * | 5/2011 | Kenefick et al. | | 705/35 |
| 8,108,229 B2 * | 1/2012 | Ika et al. | | 705/4 |
| 8,185,415 B2 | 5/2012 | Rosen et al. | | |
| 8,332,244 B1 * | 12/2012 | Karam et al. | | 705/4 |
| 8,332,245 B2 * | 12/2012 | Harkensee et al. | | 705/4 |
| 8,396,796 B1 * | 3/2013 | Vu et al. | | 705/40 |
| 2007/0021987 A1 * | 1/2007 | Binns et al. | | 705/4 |
| 2008/0077450 A1 * | 3/2008 | Klippel | | 705/4 |
| 2009/0182585 A1 * | 7/2009 | Harkensee et al. | | 705/4 |
| 2010/0131301 A1 * | 5/2010 | Collopy et al. | | 705/4 |
| 2010/0274594 A1 | 10/2010 | Vridhagriswaran et al. | | |
| 2010/0324942 A1 | 12/2010 | Rogers et al. | | |
| 2011/0066454 A1 * | 3/2011 | Rosauer et al. | | 705/4 |
| 2011/0066472 A1 | 3/2011 | Scheider | | |
| 2011/0153369 A1 * | 6/2011 | Feldman et al. | | 705/4 |
| 2012/0158434 A1 | 6/2012 | Reid | | |
| 2012/0221357 A1 * | 8/2012 | Krause et al. | | 705/4 |
| 2012/0239438 A1 * | 9/2012 | Hemmings et al. | | 705/4 |
| 2012/0245963 A1 * | 9/2012 | Peak et al. | | 705/4 |
| 2012/0290329 A1 * | 11/2012 | Ross | | 705/4 |
| 2013/0013344 A1 | 1/2013 | Ernstberger et al. | | |
| 2013/0204645 A1 * | 8/2013 | Lehman et al. | | 705/4 |

* cited by examiner

*Primary Examiner* — Frantzy Poinvil
(74) *Attorney, Agent, or Firm* — Howard IP Law Group, PC (57) ABSTRACT

According to some embodiments, historic transaction data and loss data may be received from a data storage device. Information about a potential business insurance customer may also be received and automatically analyzed to identify a set of related businesses. A coverage comparison engine may then determine insurance information for the potential business insurance customer based at least in part on historic transaction data and loss data associated with the set of related businesses.

24 Claims, 7 Drawing Sheets

FIG. 7

SYSTEMS AND METHODS TO INTELLIGENTLY DETERMINE INSURANCE INFORMATION BASED ON IDENTIFIED BUSINESSES

CROSS-REFERENCE TO RELATED APPLICATIONS

The present application claim the benefit of U.S. Provisional Patent Application No. 61/565,668 entitled "SYSTEMS AND METHODS TO DETERMINE INSURANCE INFORMATION BASED ON AN AUTOMATICALLY IDENTIFIED SET OF RELATED BUSINESSES" and filed Dec. 1, 2011. The entire contents of that application are incorporated herein by reference.

BACKGROUND

In some cases, it can be hard to accurately provide insurance information to a potential business insurance customer. For example, a small business owner might be unable or reluctant to provide detailed information about prior claims, detailed employee data, etc. As a result, it can be difficult for an insurance provider to suggest appropriate types of insurance policies, determine a recommended amount of insurance coverage and/or deductibles, and/or to predict likely insurance premium values for the small business owner. These difficulties can cause small business owners to miss opportunities to protect their enterprises. For example, a small business owner might find it difficult to determine the types and amounts of insurance coverage other business owners have purchased as well as the amount of claims that were made by those businesses.

It would therefore be desirable to provide systems and methods to efficiently and accurately determine insurance information for a potential business insurance customer.

SUMMARY OF THE INVENTION

According to some embodiments, systems, methods, apparatus, computer program code and means may be provided to efficiently and accurately provide insurance information to potential customers. In some embodiments, historic transaction data and loss data may be received from a data storage device. Information about a potential business insurance customer may also be received and automatically analyzed to identify a set of related businesses. A coverage comparison engine may then determine insurance information for the potential business insurance customer based at least in part on historic transaction data and loss data associated with the set of related businesses.

Some embodiments comprise: means for receiving historic transaction data and loss data from a data storage device; means for receiving information about a potential business insurance customer; means for automatically analyzing the received information about the potential business insurance customer to identify a set of related businesses; and means for determining, by a coverage comparison engine, insurance information for the potential business insurance customer based at least in part on historic transaction data and loss data associated with the set of related businesses.

A technical effect of some embodiments of the invention may be an improved and computerized method of determining insurance information for a potential business insurance customer. With these and other advantages and features that will become hereinafter apparent, a more complete understanding of the nature of the invention can be obtained by referring to the following detailed description and to the drawings appended hereto.

DETAILED DESCRIPTION

Figure 1:
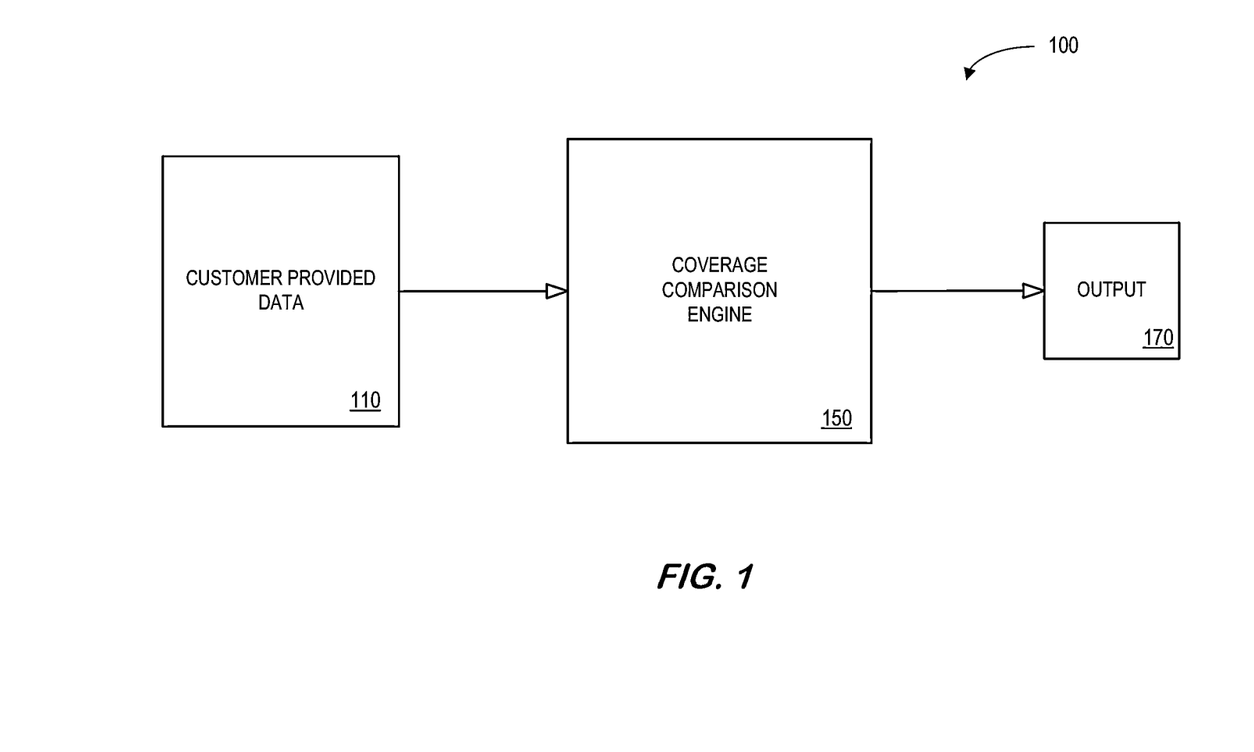
FIG. 1 is block diagram of a system according to some embodiments of the present invention.

FIG. 1 is block diagram of a system 100 according to some embodiments of the present invention. In particular, a coverage comparison engine 150 associated with an insurance provider may receive customer provided data 110. The customer provided data 110 might be received, for example, directly from a customer (e.g., via a web page). The customer provided data 110 might be received via, for example, Personal Computers (PCs), laptop computers, and/or wireless telephones that can transmit insurance data to the coverage comparison engine 150. The coverage comparison engine 150 may then generate an output 170 based at least in part on the customer provided data 110 in accordance with any of the embodiments described herein.

According to some embodiments, the "automated" coverage comparison engine 150 generates the output 170, such as an indication of a recommended level of insurance coverage for the customer. As used herein, the term "automated" may refer to, for example, actions that can be performed with little or no human intervention. By way of example only, the coverage comparison engine 150 may be associated and/or communicate with a PC, an enterprise server, or a database farm. According to some embodiments, the coverage comparison engine 150 is associated with an insurance provider or a number of different insurance providers. Moreover, according to some embodiments, a model (e.g., a multi-dimensional and/or weighted model) at the platform 150 may facilitate the generation of the output 170.

As used herein, devices including those associated with the coverage comparison engine, and any other device described herein may exchange information via any communication network (not illustrated in FIG. 1) which may be one or more of a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

Note that the coverage comparison engine 150 may be associated with various types of insurance policies, including personal insurance, business insurance, workers compensation, liability insurance, and wealth management offerings, including property and casualty insurance, life insurance, retirement and education investment products, and group benefits offerings.

Although a single coverage comparison engine 150 is shown in FIG. 1, any number of such devices may be included. Moreover, various devices described herein might be combined according to embodiments of the present invention. For example, in some embodiments, the coverage comparison engine 150 and a historic loss database might be co-located and/or may comprise a single apparatus. Moreover, according to some embodiments, internal data and/or third-party data (e.g., Dunn and Bradstreet data or similar information) may be used to supplement the information in a historic loss database.

Figure 2:
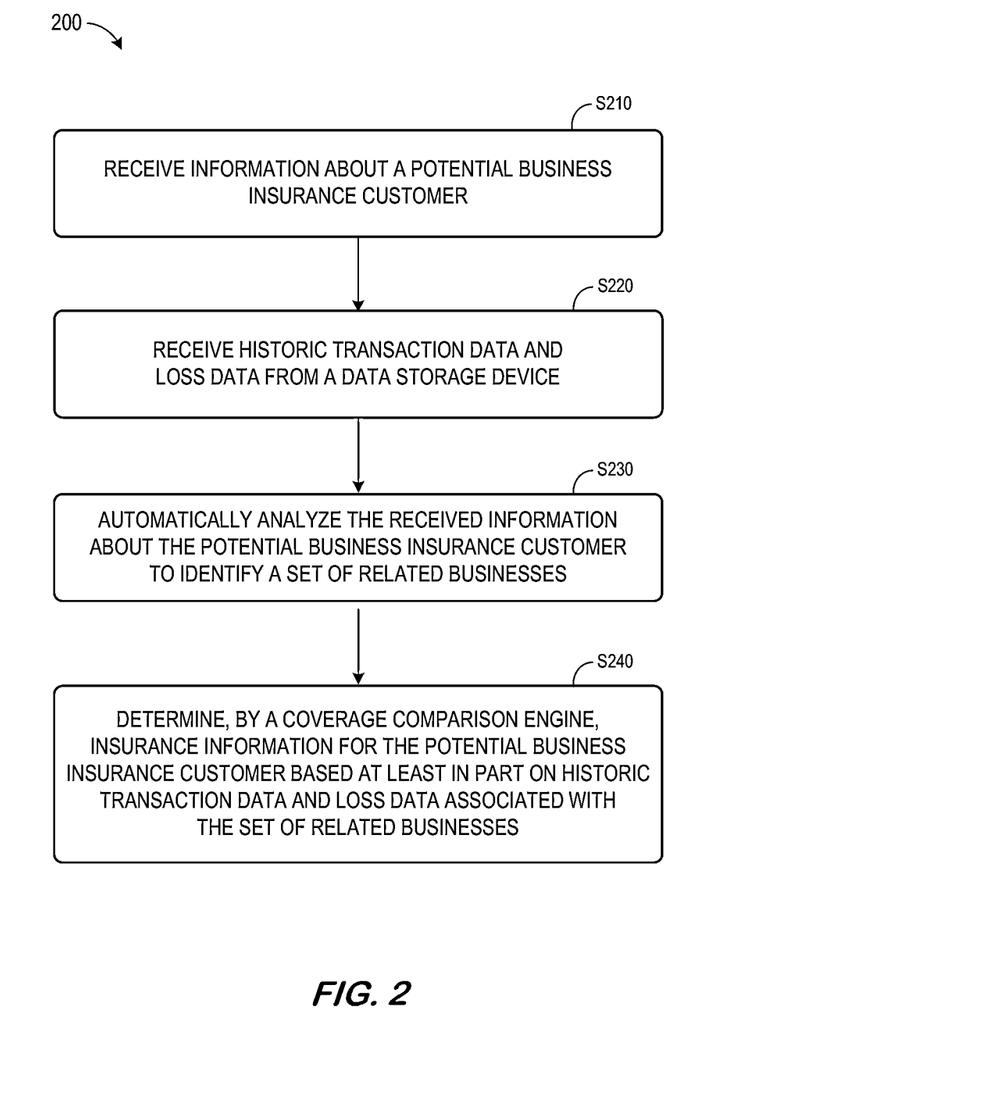
FIG. 2 illustrates a process in accordance with some embodiments of the present invention.

FIG. 2 illustrates a process 200 that might be performed, for example, by some or all of the elements of the system 100 described with respect to FIG. 1 according to some embodiments. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

The process 200 may be performed to facilitate a determination of insurance information for a potential business insurance customer. Pursuant to some embodiments, at S210, information about a potential business insurance customer may be received. The information about the potential business insurance customer might be associated with, for example, a social media site, an email address, a ZIP code, a business name, a postal address, and/or a business classification code (e.g., indicating that the business is primarily associated with "office" or "construction" work). The information about the potential business insurance customer might be received from, for example; an insurance agent, an insurance agency, a party entering information on behalf of an insurance agent, or a potential insurance customer (e.g., a small business owner). According to some embodiments, information associated with a plurality of social media networks and/or other data sources may be combined. Moreover, according to some embodiments, information may be imported from an accounting application a human resources application. For example, information about a total amount of sales during the last twelve months or information about a vehicle owned by a business might be imported from an accounting application (e.g., associated with bookkeeping or tax reporting). Note that the imported information might contain specific values or generalized profile information associated with the potential business insurance customer.

At S220 historic transaction data and loss data may be received from a data storage device. The historic transaction data and loss data might represent, for example, insurance claims associated with tens of thousands of insurance policies over many years.

At S230, the received information about the potential business insurance customer may be automatically analyzed to identify a set of related businesses. For example, a potential customer might indicate that his or her small business is associated with a dry cleaning enterprise. That information might then be used to identify related businesses, such as other dry cleaners or other companies that use potentially harmful chemicals. According to some embodiments, the set of related businesses is further identified based at least in part on information from a third party data store. The information from the third party data store might include, for example, coverage and policy transaction data and loss data from an information aggregator. Moreover, according to some embodiments, the set of related businesses may be further identified based at least in part on information from an internal data store (e.g., internal to the insurance provider).

At S240, insurance information may be determined by a coverage comparison engine for the potential business insurance customer based at least in part on historic transaction data and loss data associated with the set of related businesses. The insurance information determined for the potential business insurance customer might be associated with, for example, risk characteristics, a recommended type of insurance coverage, premium information, historical losses, average claim values, and/or a claim frequency value.

Figure 3:
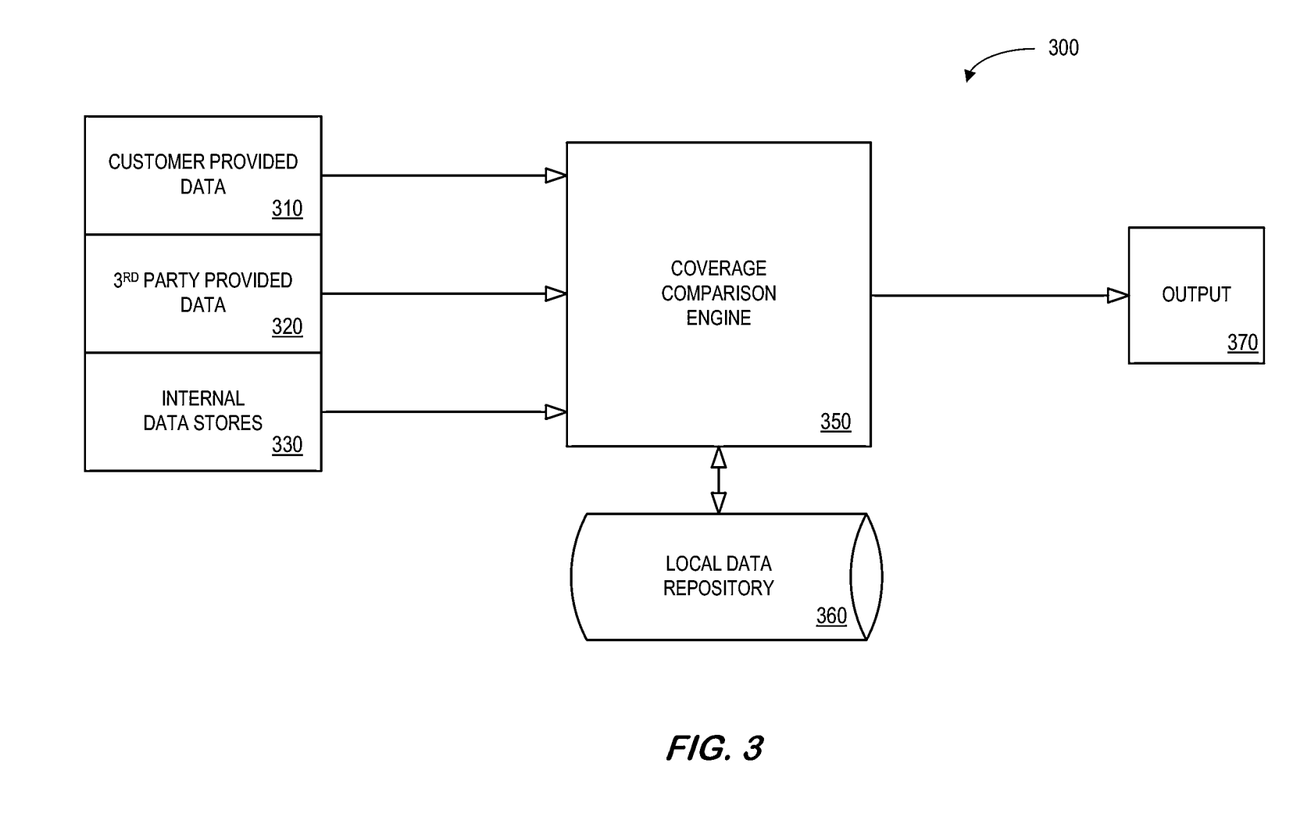
FIG. 3 is block diagram of a system according to some embodiments of the present invention.

FIG. 3 is block diagram of a system according to some embodiments of the present invention. As before, a coverage comparison engine 350 associated with an insurance provider may receive customer provided data 310. The customer provided data 310 might be received, for example, directly from a customer (e.g., via a web page) via, for example, a PC, laptop computer, and/or wireless telephone that can transmit insurance data to the coverage comparison engine 350. The coverage comparison engine 350 may then generate an output 370 based at least in part on the customer provided data 310 in accordance with any of the embodiments described herein, such as an indication of a recommended level of insurance coverage for the customer.

Although a single coverage comparison engine 350 is shown in FIG. 3, any number of such devices may be included. Moreover, various devices described herein might be combined according to embodiments of the present invention. For example, in some embodiments, the coverage comparison engine 350 and a local data repository 360 might be co-located and/or may comprise a single apparatus. Moreover, according to some embodiments, internal data stores 330 and/or third-party provided data 320 (e.g., Dunn and Bradstreet data or similar information) may be used to supplement the customer provided data 310.

According to some embodiments, the coverage comparison engine may be associated with one or more predictive models to take into account a large number of customer and/or underwriting parameters. The predictive model(s), in various implementations, may include one or more of neural networks, Bayesian networks (such as Hidden Markov models), expert systems, decision trees, collections of decision trees, support vector machines, or other systems known in the art for addressing problems with large numbers of variables. Preferably, the predictive model(s) are trained on prior data and outcomes known to an insurance company. The specific data and outcomes analyzed vary depending on the desired functionality of the particular predictive model. The particular data parameters selected for analysis in the training process may be determined by using regression analysis and/or other statistical techniques known in the art for identifying relevant variables in multivariable systems. The parameters can be selected from any of the structured data parameters stored in the present system, whether the parameters were input into the system originally in a structured format or whether they were extracted from previously unstructured text, such as from text based social media network or any other data. By way of example, a predicted number of employees or range of probable sales values may be used in connection with an estimated amount of risk or exposure.

In the present invention, the selection of weighting factors may improve the predictive power of the coverage comparison engine, as well as to increase the perceived or actual fairness of received inputs or output 370 insurance data. For example, more established and highly frequented social networking sites may be associated with a higher credibility factor, while newer, less established sites would be associated with a relatively lower credibility factor. By way of further example, more current user posts or other social networking updates may be accorded a higher weighting while older, less current information would be weighted lower.

According to some embodiments, information about a customer might be used to adjust one or more weighting factors. For example, location information associated with a customer might be used to adjust one or more weighting factors. For example, a user who generates a social networking post or request from a work site might be given more credibility as compared to other potential customers. As other examples, a customer who has a high reputation on a web site, who generates many social media network posts, and/or who has experienced a lot of transactions with an insurer might be associated with a relatively high weighting factor. Moreover, the inclusion of image, video, and/or audio information might increase a weighting factor associated with received information.

Figure 4:
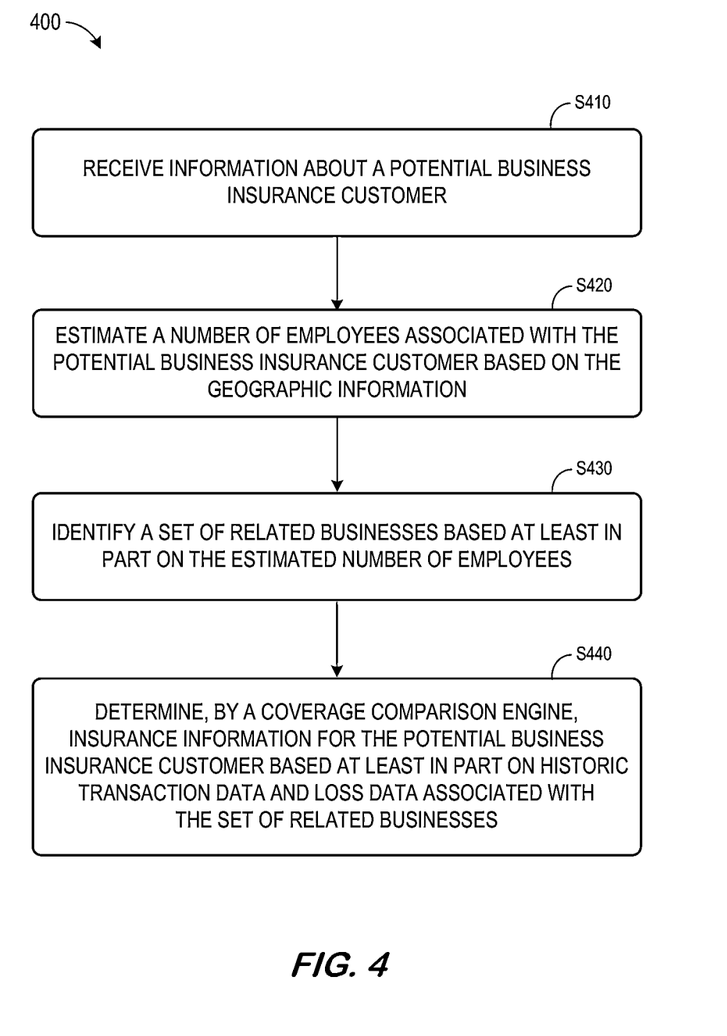
FIG. 4 illustrates a method according to some embodiments of the present invention.

FIG. 4 illustrates a method 400 according to some other embodiments of the present invention. At S410, information about a potential business insurance customer may be received. The information about the potential business insurance customer might be associated with, for example, a social media site, an email address, a ZIP code, a business name, a postal address, and/or a business classification code. According to this embodiment, the received information about the potential business customer includes geographic information, such as a postal address or ZIP code.

At S420, a number of employees associated with the potential business insurance customer is estimated based on the geographic information. For example, an insurance model might determine that a vast majority of businesses in a particular ZIP code have less than twenty employees. As a result, it may be inferred that the potential business insurance customer in that ZIP code will also have less than twenty employees. Note that instead of a number of employees, embodiments may instead infer a total payroll value (and/or job titles or benefits associated with employees), a property value, a type of industry, or any other useful information. Moreover, note that information from multiple social media networks and/or other data sources might be combined in accordance with any of the embodiments described herein.

At S430, the estimated number of employees is automatically analyzed to identify a set of related businesses (e.g., other businesses having a similar number of employees). At S440, insurance information may be determined by a coverage comparison engine for the potential business insurance customer based at least in part on historic transaction data and loss data associated with the set of related businesses. The insurance information determined for the potential business insurance customer might be associated with, for example, risk characteristics, a recommended type of insurance coverage, and/or premium information.

Figure 5:
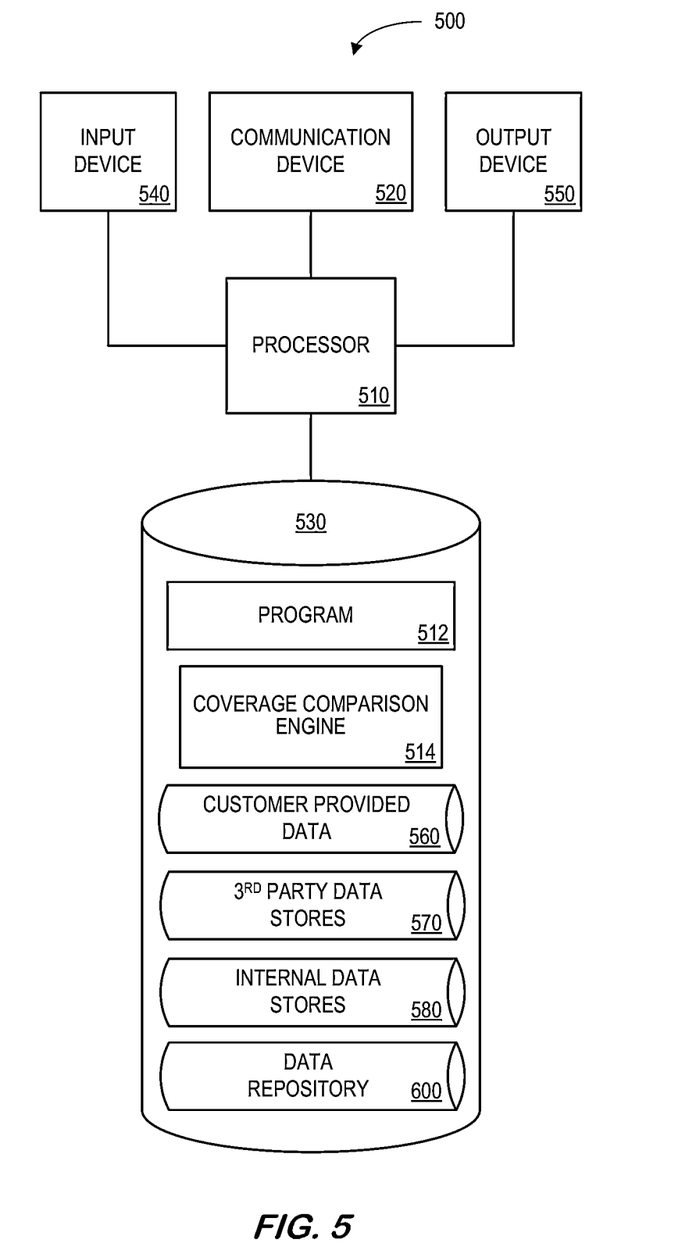
FIG. 5 is an example of coverage comparison platform according to some embodiments.

As a result of the embodiments described herein, an improved system and method to facilitate a determination of insurance information for a potential business insurance customer may be achieved. Note that embodiments described herein may be implemented in any number of different ways. For example, FIG. 5 is a block diagram overview of a coverage comparison platform 500 according to some embodiments. The coverage comparison platform 500 may be, for example, associated with the system 100 of FIG. 1 or the system 300 of FIG. 3. The coverage comparison platform 500 comprises a processor 510, such as one or more commercially available Central Processing Units (CPUs) in the form of one-chip microprocessors, coupled to a communication device or interface 520 configured to communicate via a communication network (not shown in FIG. 5). The communication device 520 may be used to communicate, for example, with one or more remote customer or agent devices. The coverage comparison platform 500 further includes an input device 540 (e.g., a mouse and/or keyboard to enter rule and/or model adjustments) and an output device 550 (e.g., a computer monitor to display reports and/or aggregated results to an administrator).

The processor 510 also communicates with a storage device 530. The storage device 530 may comprise any appropriate information storage device, including combinations of magnetic storage devices (e.g., a hard disk drive), optical storage devices, mobile telephones, vehicle computers, and/or semiconductor memory devices. The storage device 530 stores a program 512 and/or a coverage comparison engine 514 for controlling the processor 510. The processor 510 performs instructions of the programs 512, 514, and thereby operates in accordance with any of the embodiments described herein. For example, the processor 510 may receive historic transaction data and loss data from a data storage device. Information about a potential business insurance customer may also be received by the processor 510 and automatically analyzed to identify a set of related businesses. The coverage comparison engine 514 may then determine insurance information for the potential business insurance customer based at least in part on historic transaction data and loss data associated with the set of related businesses.

The programs 512, 514 may be stored in a compressed, uncompiled and/or encrypted format. The programs 512, 514 may furthermore include other program elements, such as an operating system, a database management system, and/or device drivers used by the processor 510 to interface with peripheral devices.

As used herein, information may be "received" by or "transmitted" to, for example: (i) the coverage comparison platform 500 from another device; or (ii) a software application or module within the coverage comparison platform 500 from another software application, module, or any other source.

In some embodiments (such as shown in FIG. 5), the storage device 530 stores customer provided data 560, third party data stores 570, internal data stores 580, and a data repository 600. Examples of a database that may be used in connection with the coverage comparison platform 500 will now be described in detail with respect to FIG. 6. Note that the database described herein is only an example, and additional and/or different information may be stored therein. Moreover, various databases might be split or combined in accordance with any of the embodiments described herein.

Figure 6:
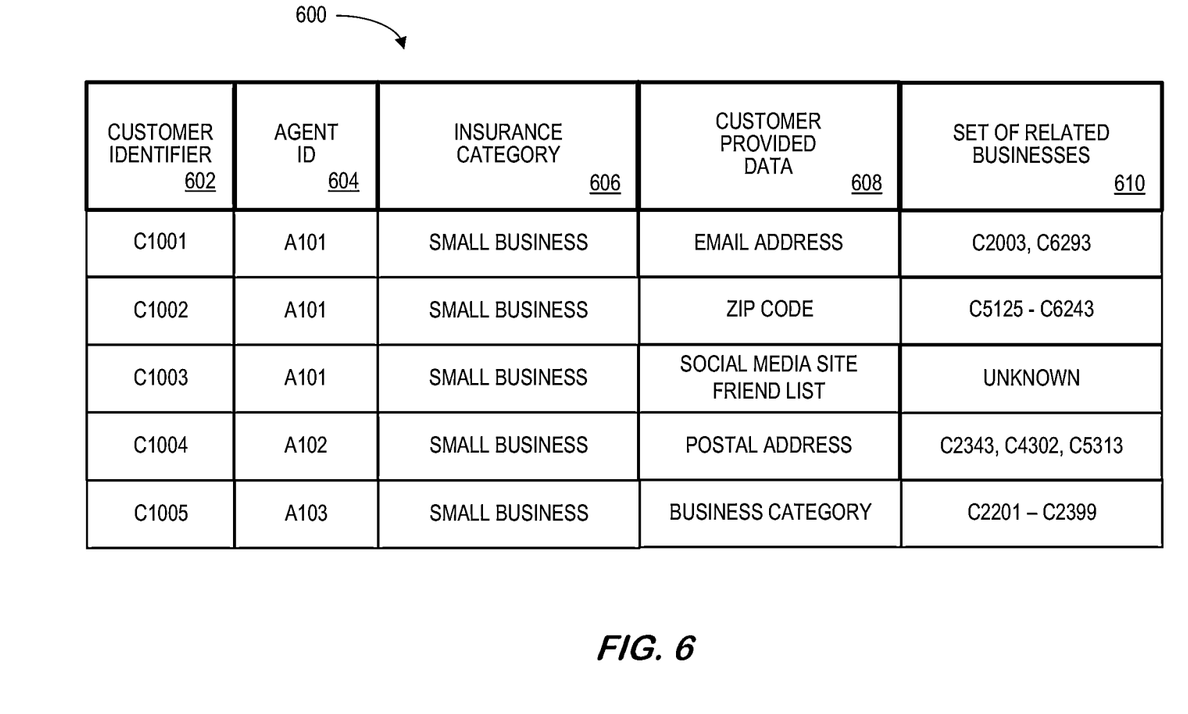
FIG. 6 is a tabular portion of a data repository according to some embodiments.

Referring to FIG. 6, a table is shown that represents the data repository 600 that may be stored at the coverage comparison platform 500 according to some embodiments. The table may include, for example, entries identifying potential small business customers requesting information in connection with insurance policies. The table may also define fields 602, 604, 606, 608, 610 for each of the entries. The fields 602, 604, 606, 608, 610 may, according to some embodiments, specify: a customer identifier 602, an agent identifier 604, an insurance category 606, customer provided data 608, and a set of related businesses. The information in the submitted data database 600 may be created and updated, for example, whenever data is submitted by a customer.

The customer identifier 602 may be, for example, a unique alphanumeric code identifying a potential small business customer who has provided information (e.g., in connection with a quote request for an insurance policy application). The agent identifier 604 might indicate the agent who submits the data and the insurance category 606 might indicate the type of insurance being applied for by the agent. The customer provided data 608 might represent, for example, an email address, ZIP code, postal address, etc. The set of related businesses 610 may be an automatically determined list of businesses that may be related to the customer associated with the customer identifier 602. The set of related businesses 610 may then be used to evaluate historical risk data, loss values, etc. that may be used to generate insurance information for that customer.

Figure 7:
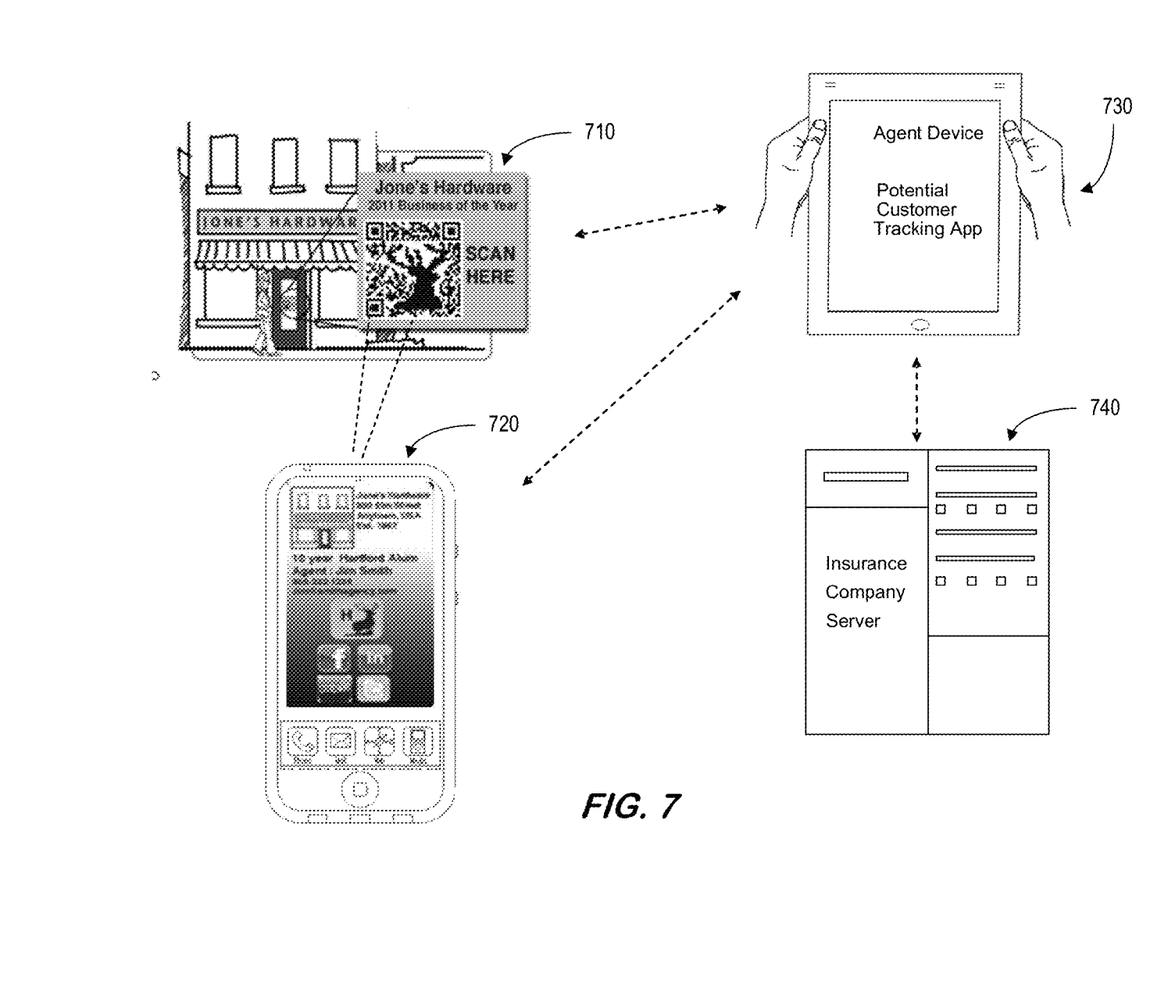
FIG. 7 is an example of receiving information about a potential business insurance customer according to some embodiments.

Information about a potential business insurance customer may be received in any of a number of different ways. FIG. 7 is an example of receiving information about a potential business insurance customer according to some embodiments. In this example, a potential business insurance customer might scan a Quick Response ("QR") matrix or two-dimensional bar code 710 associated with his or her business, take a picture of the business, and/or otherwise enter information via a mobile device 720. Mobile device 720 may be a smartphone, personal computer or tablet computing device and may be configured to capture and display information associated with the present invention. According to some embodiments, the information might be sent through an insurance agent device 730 (e.g., associated with a potential customer tracking application) before being received by an insurance company server 740. According to other embodiments, the information may be sent directly from the customer's mobile device 720 to the insurance company server 740. The insurance company server 740 may then execute the steps described with respect to FIG. 2 or any other embodiments described herein. According to some embodiments, a third-party service might provide questions to patrons of the potential small business client and this information may be used by the insurance company server.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems). Additional, one or more of the elements described herein may be practiced in a distributed cloud computing environment where tasks are performed by logically or physically remote processing devices that are linked through one or more communications networks.

Applicants have discovered that embodiments described herein may be particularly useful in connection with insurance products. Note, however, that other types of insurance and related products may also benefit from the invention. For example, embodiments of the present invention may be used to determine data for financial, medical, educational, and other types of information.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A computer system for processing third party computer system data and geographic data, comprising:
    a data storage device storing data associated with historic transaction data and loss data;
    a communication device configured to receive data comprising at least business entity data, comprising geographic data, and dynamically updated data from social networking sites and to output the received data;
    an estimator device configured to receive data about the business entity from the communication device and to, responsive to receipt of the information about the business entity automatically determine based on the received information about the business entity an estimate of a number of employees associated with the business entity;
    a data weighting device configured to: apply weighting factors to the received information including a first weighting factor to received information from social networking sites indicative of at least a threshold number of social networking posts being made from business locations associated with the business entity and a second weighting factor to received information from social networking sites indicative of less than the threshold number of social networking posts being made from business locations associated with the business entity, wherein the first weighting factor is higher than the second weighting factor; and
    a comparison engine configured to receive weighted data from the data weighting device and apply one or more predictive models, trained on the historic transaction data and loss data, to the weighted received information and the estimated number of employees to determine insurance information for the business entity
        the communication device being further configured to output to a computer monitor the determined insurance information for the potential business customer.

2. The system of claim 1, wherein the determined insurance information includes an estimated amount of risk.

3. The system of claim 1, wherein the estimator device is further configured to estimate one or more of a sales value, a total payroll value, job titles associated with employees, benefits associated with the employees, a property value, or a type of industry of the business entity based on the received information.

4. A computer system for processing third party computer system data and geographic data, comprising:
    a data storage device storing data associated with historic transaction data and loss data;
    a communication device configured to receive data comprising at least business entity data, comprising geographic data, and dynamically updated data from social networking sites and to output the received data;
    an estimator device configured to receive data about the business entity from the communication device and to, responsive to receipt of the information about the business entity, automatically determine an estimate of a number of employees associated with the business entity;
    a data weighting device configured to: apply weighting factors to the received information including applying a first weighting factor to received information from social networking sites indicative of the business entity having a reputation on the social networking sites of at least a threshold level and applying a second weighting factor to received information from social networking sites indicative of the business entity having a reputation on the social networking sites less than the threshold level, wherein the first weighting factor is higher than the second weighting factor; and a comparison engine configured to receive weighted data from the data weighting device and apply one or more predictive models, trained on the historic transaction data and loss data, to the weighted received information and the estimated number of employees to determine insurance information for the business entity; and the communication device being further configured to output to a computer monitor the determined insurance information.

5. The system of claim 4, wherein the insurance information determined for the business entity includes an estimated amount of risk.

6. The system of claim 4, wherein the estimator device is further configured to estimate one or more of a sales value, a total payroll value, job titles associated with employees, benefits associated with the employees, a property value, and a type of industry of the business entity based on the received information.

7. A computer system for processing third party computer system data and stored transaction data, comprising:

a data storage device storing data associated with historic transaction data and loss data;

a communication device configured to receive data comprising at least business entity data, comprising geographic data, and dynamically updated data from social networking sites and to output the received data;

an estimator device configured to receive data about the business entity from the communication device and to, responsive to receipt of the information about the business entity: automatically determine based on the received information about the business entity an estimate of a number of employees associated with the business entity;

a data weighting device configured to: apply weighting factors to the received information including applying a first weighting factor to received information indicative of the business entity having at least a threshold number of previous transactions processed by an insurance entity computer system and a second weighting factor to received information indicative of the business entity having less than a threshold number of previous transactions processed by the insurance entity computer system, wherein the first weighting factor is higher than the second weighting factor; and a comparison engine configured to receive weighted data from the data weighting device and apply one or more predictive models, trained on the historic transaction data and loss data, to the weighted received information and the estimated number of employees to; determine insurance information for the business entity the communication device being further configured to output to a computer monitor the determined insurance information.

8. The system of claim 7, wherein the insurance information determined for the business entity includes an estimated amount of risk.

9. The system of claim 7, wherein the estimator device is further configured to estimate one or more of a sales value, a total payroll value, job titles associated with employees, benefits associated with the employees, a property value, and a type of industry of the business entity based on the received information.

10. A computer-implemented method for processing third party computer system data and geographic data, comprising:

receiving by a computer processor historic transaction data and loss data from a data storage device;

receiving by a communication device in communication with the computer processor information about a business entity from a communications interface including geographic information;

receiving, by an estimator device, from the communication device, information about the business entity, and, responsive to receipt of the information about the business entity: automatically determining by the estimator device based on the received information about the potential small commercial insurance customer an estimated number of employees associated with the business entity;

by a data weighting device, applying weighting factors to the received information including applying a first weighting factor to received information from social networking sites indicative of at least a threshold number of social networking posts being made from business locations associated with the business entity and applying a second weighting factor to received information from social networking sites indicative of less than the threshold number of social networking posts being made from business locations associated with the business entity, wherein the first weighting factor is higher than the second weighting factor;

determining, by a coverage comparison engine applying one or more predictive models trained on the historic transaction data and loss data, insurance information for the business entity based at least in part on the estimated number of employees and the weighted received information; and outputting to a computer monitor the determined insurance information.

11. The method of claim 10, wherein the determined insurance information includes an estimated amount of risk.

12. The method of claim 10, further comprising estimating by the estimator device at least one of a sales value, a total payroll value, job titles associated with employees, benefits associated with the employees, a property value, or a type of industry of the business entity based on the received information.

13. A computer-implemented method for processing third party computer system data and geographic data, comprising:

receiving by a computer processor historic transaction data and loss data from a data storage device;

receiving by a communication device in communication with the computer processor information about a business entity from a communications interface including geographic information;

receiving, by an estimator device, from the communication device, information about the business entity, and, responsive to receipt of the information about the business entity:

automatically determining by the estimator device based on the received information about the business entity an estimated number of employees associated with the business entity;

by a data weighting device, applying weighting factors to the received information including applying a first weighting factor to received information from social networking sites indicative of the business entity having a reputation on the social networking sites of at least a threshold level and applying a second weighting factor to received information from social networking sites indicative of the business entity having a reputation on the social networking sites less than the threshold level, wherein the first weighting factor is higher than the second weighting factor; and determining, by a coverage comparison engine, applying one or more predictive models trained on the historic transaction data and loss data, insurance information for the business entity based at least in part on the estimated number of employees and the weighted received information; and outputting to a computer monitor the determined insurance information.

14. The method of claim 13, wherein the insurance information determined for the business entity includes an estimated amount of risk.

15. The method of claim 13, further comprising estimating by the estimator device at least one of a sales value, a total payroll value, job titles associated with employees, benefits associated with the employees, a property value, and a type of industry of the business entity based on the received information.

16. A computer-implemented method for processing geographic data and stored transaction data, comprising:

receiving by a computer processor historic transaction data and loss data from a data storage device;

receiving by a communication device in communication with the computer processor information about a business entity from a communications interface including geographic information;

receiving, by an estimator device, from the communication device, information about the business entity, and, responsive to receipt of the information about the potential small commercial insurance customer:

automatically determining by the estimator device computer processor based on the received information about the business entity an estimated number of employees associated with the business entity;

by a data weighting device, applying by the computer processor weighting factors to the received information including applying a first weighting factor to received information indicative of the business entity having at least a threshold number of previous transactions processed by an insurance entity computer system and applying a second weighting factor to received information indicative of the business entity having less than the threshold number of previous transactions processed by the insurance entity computer system, wherein the first weighting factor is higher than the second weighting factor; and determining, by a coverage comparison engine, applying one or more predictive models trained on the historic transaction data and loss data, insurance information for the business entity based at least in part on the estimated number of employees and the weighted received information; and outputting to a computer monitor the determined insurance information.

17. The method of claim 16, wherein the insurance information determined for the business entity includes an estimated amount of risk.

18. The method of claim 16, further comprising estimating by the estimator device at least one of a sales value, a total payroll value, job titles associated with employees, benefits associated with the employees, a property value, and a type of industry of the business entity based on the received information.

19. A non-transitory computer-readable medium storing instructions adapted to be executed by a computer processor to process third party computer system data and geographic data, the method comprising:

receiving historic transaction data and loss data from a data storage device;

receiving information about a business entity including geographic information;

responsive to receipt of the information about the business entity:

automatically determining, based on the received information about the business entity, an estimate of a number of employees associated with the business entity;

applying weighting factors to the received information including applying a first weighting factor to received information from social networking sites indicative of at least a threshold number of social networking posts being made from business locations associated with the business entity and applying a second weighting factor to received information from social networking sites indicative of less than the threshold number of social networking posts being made from business locations associated with business entity, wherein the first weighting factor is higher than the second weighting factor; and determining, by applying one or more predictive models trained on the historic transaction data and loss data, insurance information for the business entity based at least in part on the estimate of the number of employees and the weighted received information.

20. The non-transitory computer-readable medium of claim 19, wherein the insurance information determined for the business entity includes an estimated amount of risk.

21. The non-transitory computer-readable medium of claim 19, wherein determining insurance information for the business entity further comprises estimating one or more of a sales value, a total payroll value, job titles associated with employees, benefits associated with the employees, a property value, and a type of industry of the business entity based on the received information.

22. A non-transitory computer-readable medium storing instructions adapted to be executed by a computer processor to process geographic data and stored transaction data, the method comprising:

receiving historic transaction data and loss data from a data storage device;

receiving information via a communications network about a business entity including geographic information;

responsive to receipt of the information about the business entity:

automatically determining, based on the received information about the business entity, an estimate of a number of employees associated with the business entity;

applying weighting factors to the received information including applying a first weighting factor to received information indicative of the business entity having at least a threshold number of previous transactions processed by an insurance entity computer system and applying a second weighting factor to received information indicative of the business entity having less than a threshold number of previous transactions processed by the insurance entity computer system, wherein the first weighting factor is higher than the second weighting factor;

determining, by applying one or more predictive models trained on the historic transaction data and loss data, insurance information for the business entity based at least in part on the estimate of the number of employees and the weighted received information; and transmitting the insurance information to one or more devices.

23. The non-transitory computer-readable medium of claim 22, wherein the insurance information determined for the business entity includes an estimated amount of risk.

24. The non-transitory computer-readable medium of claim 22, wherein determining insurance information for the business entity further comprises estimating one or more of a sales value, a total payroll value, job titles associated with employees, benefits associated with the employees, a property value, and a type of industry of the business entity based on the received information.

* * * * *